United States Patent [19]
Gonas

[11] Patent Number: 4,779,313
[45] Date of Patent: Oct. 25, 1988

[54] RETAINER FOR MOLDED PANEL

[75] Inventor: Albert J. Gonas, Grosse Point, Mich.

[73] Assignee: Voplex Corporation, Pittsford, N.Y.

[21] Appl. No.: 86,566

[22] Filed: Aug. 18, 1987

Related U.S. Application Data

[63] Continuation-in-part of Ser. No. 895,174, Aug. 11, 1986, abandoned, which is a continuation of Ser. No. 635,643, Jul. 30, 1984, abandoned.

[51] Int. Cl.[4] .............................................. E04F 19/02
[52] U.S. Cl. ...................................... 24/289; 24/294; 403/406.1; 248/1 R
[58] Field of Search .................. 24/289, 292, 293–295; 428/101; 248/217.3, 221.4, 916, 297.3; 52/717–719, 511; 403/406.1, 405.1

[56] References Cited

U.S. PATENT DOCUMENTS

| | | | |
|---|---|---|---|
| 2,275,127 | 3/1942 | Brown | 24/294 X |
| 2,425,025 | 8/1947 | Boisselier | 248/217.3 X |
| 3,064,724 | 11/1962 | Nowell | 248/221.4 X |
| 3,145,439 | 8/1964 | Knowlton | 24/289 |
| 3,202,291 | 8/1965 | Root | 248/500 X |
| 3,389,526 | 6/1968 | Meyer | 52/718 |
| 3,466,709 | 9/1969 | Brown | 24/289 |
| 3,809,799 | 5/1974 | Taylor | 248/221.4 X |
| 4,119,285 | 10/1978 | Bisping et al. | 248/221.4 X |
| 4,312,165 | 1/1982 | Mizusawa | 52/511 |
| 4,424,612 | 1/1984 | Muller et al. | 24/289 X |
| 4,480,360 | 11/1984 | Brugman et al. | 24/292 X |

FOREIGN PATENT DOCUMENTS

| | | | |
|---|---|---|---|
| 351369 | 6/1931 | United Kingdom | 52/717 |
| 659098 | 10/1951 | United Kingdom | 52/511 |

*Primary Examiner*—Kenneth J. Dorner
*Assistant Examiner*—Laurie K. Cranmer
*Attorney, Agent, or Firm*—Stonebraker, Shepard & Stephens

[57] ABSTRACT

A retainer for a molded panel has a base 10 with a flat region 15 and projections 13 extending into the material of the molded panel to retain base 10 securely in place. Edge regions 12, extending away from the panel surface, interlock with a cap 11 located to straddle base 10 and have a central region 20 spaced from base 10 to receive and hold a fastener securing the cap, retainer and panel in place. Interchangeable caps 11, made in varying heights to span varying distances between a panel and its anchorage, can be mounted on universal base 10.

13 Claims, 2 Drawing Sheets

RETAINER FOR MOLDED PANEL

RELATED APPLICATIONS

This application is a continuation-in-part of parent application 895,174, filed Aug. 11 1986, entitled RETAINER FOR MOLDED PANEL, and abandoned upon the filing of this continuation-in-part application, which parent application was a continuation of grandparent application Ser. No. 635,643, filed July 30, 1984, entitled RETAINER FOR MOLDED PANEL, and abandoned upon the filing of the parent application.

BACKGROUND

Panel retainers are used in large quantities to secure automotive door panels in place. The retainers have bases attached to the insides of the door panels and caps that extend above the bases to hold fasteners securing the panels to the sheet metal structure of the door. Extenders can be connected between the retainer caps and the fasteners for bridging varying spaces between the panel and the door.

The bases of such panel retainers can have barbs formed in a variety of shapes that can be pressed into a molded panel to hold the retainer in place with the caps spaced from the panel to receive a fastener. Pressed-in barbs are weaker than desirable, however, for panels molded of cellulose fiber and resin materials.

Retainers can also be molded into position on panels as they are formed, but this requires that the base region of the retainer be able to contain the material being molded under pressure to form the panel. It also requires that the base extend under the cap so that the molded material is not pressed against the underside of the cap, precluding attachment of a fastener to the cap. Superposing a cap over a continuous base has the disadvantage of extra material and manufacturing expense, however.

Another problem inadequately solved by prior art panel retainers for automotive doors is ways of bridging the varying distances between a panel and the sheet metal to which it is secured. Varying length "Christmas tree" fasteners and extensions for Christmas tree fasteners have been used for this, but these variations require costly tooling, again adding to the expense.

I have discovered a more versatile and reliable panel retainer that can be made at a low cost. It better serves the needs of the automotive industry for door panel retainers, and it can also be used for retaining panels in place for other purposes or for retaining in place other molded items having various shapes intended to be encompassed within the term "panel". My panel retainer can be either pressed into a premolded object or molded in place as an object or panel is formed. It also accommodates different height caps for bridging different distances to an anchorage.

SUMMARY OF THE INVENTION

My panel retainer has a plane base with projections disposed for retaining the base securely on the surface of a panel. A plurality of interchangeable caps varying in height are arranged to interlock with base edge regions that extend away from the panel surface. The caps and the edge regions are formed to locate a mounted cap in a position straddling the base so that a central region of the cap positioned over the base can receive and hold a fastener securing the cap, retainer, and panel in place. Different heights of interchangeable caps can span different distances between, the panel and its anchorages.

DRAWINGS

DETAILED DESCRIPTION

Figure 1:
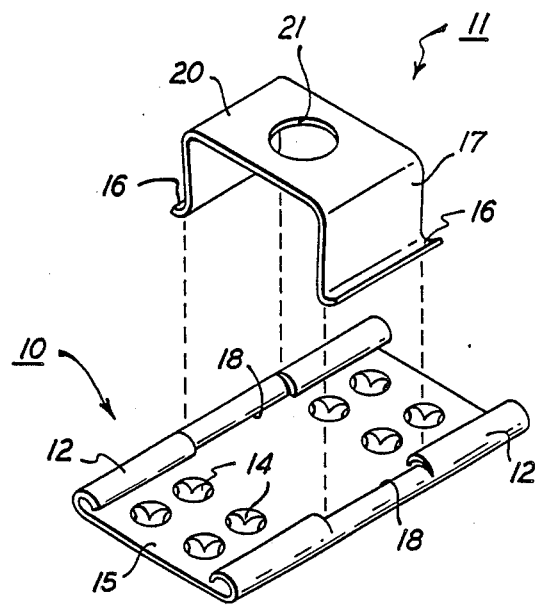
FIG. 1 is an exploded perspective view of a preferred embodiment of my retainer.

My retainer uses a universal attachment base 10 and attaching caps 11 of various heights that can interlock with base 10 to support Christmas tree or other fasteners anchoring the panel in place. Base 10 is shaped so it can be either molded or pressed into the material forming a panel, where it can connect to caps 11 of whatever heights are required.

Base 10 is preferably formed of sheet metal with rolled edges 12 that are turned inward along opposite sides of base 10. A central region 15 of base 10 between rolled edges 12 is generally flat and sufficiently continuous to contain at a panel surface material compressed against base 10 as the panel is molded.

Barbs 13, formable in many different shapes, extend below the underside of base 10 in an array that interlocks the plane central region 15 securely with the panel material, which can include cellulose fiber and resin material. Openings 14 within each circular array of barbs 13 are small enough to contain the material of a panel being molded so that plane region 15 can lie on the panel back surface with barbs 13 extending into the panel thereby locking base 10 with the molded panel material. Barbs 13 can also be formed to penetrate and attach to molded panel material, allowing base 10 to be pressed into a retained position on the surface of a previously molded panel.

Cap 11 is generally U-shaped as illustrated and can be formed of sheet metal or resin. Cap 11 includes a top surface or upper region 20 and a pair of side walls 17 depending from the top surface, the side walls each terminating at a lower edge 16. Its lower edges 16 interlock under rolled edges 12, which have central tabs 18 that are bent inward from edges 12 to form notches axially locating edges 16 relative to base 10. Edges 16 squeeze together as cap 11 is snap fit into notches formed by tabs 18 in rolled edges 12. This locates cap 11 longitudinally of base 10 and traps its edges 16 under base edges 12 for a secure and permanent interlock between cap 11 and base 10.

Figure 2:
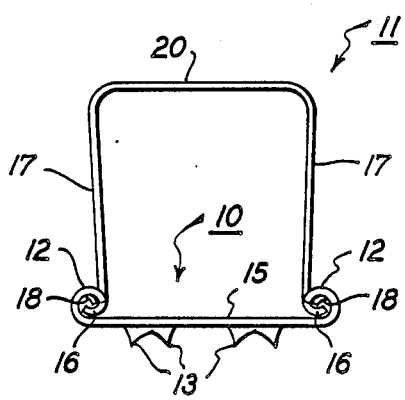
FIG. 2 is an end elevational view of the retainer of FIG. 1.

A central upper region 20 of cap 11 stands over base 10 and is apertured as at 21 to hold a fastener, such as a Christmas tree fastener, securing the cap 11, base 10, and the attached panel in place against a mounting structural member or anchorage. A relatively short cap 11 of FIG. 1 disposes central region 20 a short distance above base 10, and a taller cap 11 as shown in FIG. 2 disposes central region 20 farther above base 10.

Universal bse 10 reduces tooling cost to a minimum, because bases are simple to attach to panels without regard for the height of the caps they will bear. Moreover, caps 11 are simple and easy to make in varying heights. They eliminate extender problems and bridge any desired gap between the panel and the fastener anchorage.

Figure 3:
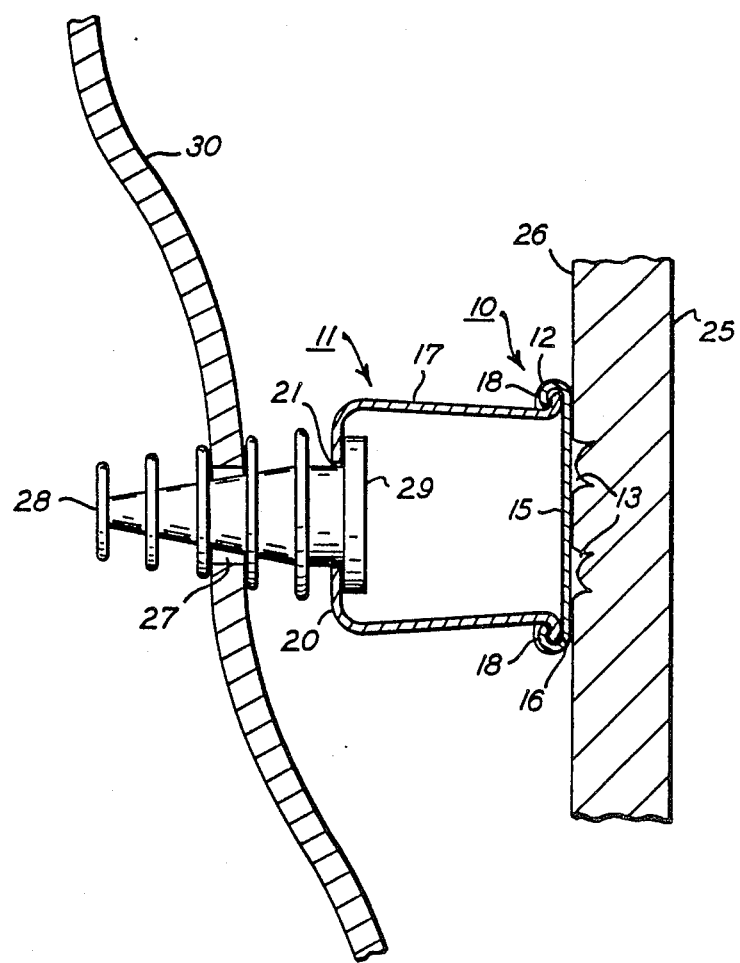
FIG. 3 is a cross-sectional view of a retainer, such as shown in FIGS. 1 and 2, attached to a panel and fastened to a support structure.

The way the retainer works to install a panel in place is shown in FIG. 3. Base 10 is attached to a back surface 26 of panel 25 by the penetration of barbs 13 into panel 25. This can be done by driving barbs 13 into the material of panel 25, after panel 25 is molded, or, as I prefer, by molding panel 25 with its back surface 26 formed against plane region 15 of base 10. Openings 14 in region 15 are sufficiently small so that the material forming panel 25, during the pressurized molding process, does not pass through openings in plane region 15.

Several bases 10 can be attached to panel 25 in suitable locations for mounting panel 25 on supporting structure 30. Since structure 30 is not evenly spaced from the mounting position of panel 25, attaching caps 11 of varying heights are selectively interlocked with each base 10, as described above, to bridge varying distances between panel 25 and supporting structure 30.

A fastener 28 has a head 29 that mounts in opening 21 in upper region 20 of attaching cap 11, and fastener 28 extends through a hole 27 in supporting structure 30. Different forms of fasteners can be used, and fasteners can be mounted in various ways in opening 21 of top region 20.

Once a fastener is pressed into or otherwise secured in, hole 27 in supporting structure 30, it holds attaching cap 11 firmly in place. In turn, attaching cap 11 bridges the distance to base 10 with which it interlocks, and base 10 is firmly attached to panel 25 by barbs 13 so that panel 25 is mounted firmly on supporting structure 30. The closed plane region 15 of base 10 allows it to be molded in place against back surface 26 of panel 25, and the simple attaching caps 11, with their varying heights, efficiently span different distances from base 10 to fastener 28.

I claim:

1. A retainer for attachment to a back surface of a molded panel to support a fastener securing said retainer and said panel to a supporting structure, said retainer comprising:
    a. a base having a plane region formed with a plurality of panel penetrating projections integral with said plane region and formed to extend from said plane region to accomplish said attachment;
    b. opposite edge portions of said base being formed to extend away from said plane region and to extend back toward said plane region to form confronting interlocks;
    c. a central region of each of said interlocks on said opposite edge portions having a discontinuity;
    d. a plurality of attaching caps interchangeably attachable to said base via said interlocks;
    e. each of said attaching caps having an upper central region formed with a fastener receiving opening;
    f. each of said attaching caps having a pair of resilient side walls extending from said upper central region to opposite lower edges of said attaching caps, said lower edges being engageable in a snap fit with said interlocks;
    g. said resilient side walls of said plurality of attaching caps each having different lengths to dispose said upper central regions at varying distances from said base; and
    h. said resilient side walls of said attaching caps having a width substantially narrower than a length of said base so that said opposite lower edges of said side walls resiliently interlock with said opposite edges of said base portions within said discontinuities in said central regions, said discontinuities being as long as said width of said resilient side walls.

2. The retainer of claim 1 wherein said opposite edge portions of said base are rolled inward to confront each other across said base.

3. The retainer of claim 2 wherein one of said caps mounted on said base straddles a mid-region of said base.

4. The retainer of claim 1 wherein said base is attached to said back surface of said molded panel, one of said attaching caps is attached to said base, a fastener is arranged in said fastener receiving opening, and said fastener connects to said supporting structure.

5. The retainer of claim 1 wherein said fastener receiving opening is a hole formed in each of said attaching caps.

6. The retainer of claim 1 wherein said discontinuity is formed by said central region being bent to a different position than end regions of said interlocks.

7. The retainer of claim 1 wherein said plane region of said base has sufficiently small openings so that said panel can be molded under pressure with said back surface formed against said plane region without panel material passing through said plane region.

8. An automotive panel fastening system for securing an automotive panel to a supporting structure, said system comprising:
    a. a fastener extending through a hole in said supporting structure, a retainer base secured to a back surface of said panel, and one of a plurality of different sized attaching caps bridging a distance between said fastener and said retainer base;
    b. each of said attaching caps having an upper central region formed with an opening receiving a head of said fastener;
    c. each of said attaching caps having a pair of resilient side walls extending from said upper central region to opposite lower edges of said attaching caps, said side walls varying in length to allow different ones of said attaching caps to bridge different distances from said retainer base to said fastener head;
    d. said retainer base having a plane region formed with a plurality of panel penetrating projections integral with said plane region and formed to extend from said plane region into said back surface of said panel;
    e. opposite edge portions of said base being formed to extend away from said plane region and to extend back toward said plane region to conform confronting interlocks;
    f. a central region of each of said interlocks on said opposite edge portions of said base having a discontinuity; and
    g. said opposite lower edges of said attaching cap being engageable in a snap fit with said central regions of said interlocks so that said discontinuities hold said attaching cap astraddle a central region of said base.

9. The retainer of claim 8 wherein said opposite edge portions of said base are rolled inward to confront each other across said base.

10. The retainer of claim 8 wherein said fastener receiving opening is a hole formed in each of said attaching caps.

11. The retainer of claim 8 wherein said discontinuity is formed by said central region being bent to a different position than end regions of said interlocks.

12. The retainer of claim 8 wherein said discontinuity is as long as a width of said resilient side walls.

13. The retainer of claim 8 wherein said plane region of said base has sufficiently small openings so that said panel can be molded under pressure with said back surface formed against said plane region without panel material passing through said plane region.

* * * * *